United States Patent
Narita et al.

(10) Patent No.: US 8,500,397 B2
(45) Date of Patent: Aug. 6, 2013

(54) SEALS IN STEAM TURBINE

(75) Inventors: Kenjiro Narita, Hitachinaka (JP); Haruyuki Yamazaki, Tokai (JP); Hiroyuki Doi, Tokai (JP); Kei Kobayashi, Kitaibaraki (JP); Hajime Toriya, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/396,033

(22) Filed: Feb. 14, 2012

(65) Prior Publication Data
US 2012/0148389 A1 Jun. 14, 2012

Related U.S. Application Data

(63) Continuation of application No. 12/326,216, filed on Dec. 2, 2008, now Pat. No. 8,128,351.

(30) Foreign Application Priority Data

Dec. 4, 2007 (JP) ................................. 2007-313803

(51) Int. Cl.
*F01D 5/20* (2006.01)
*F01D 11/08* (2006.01)
*F04D 29/08* (2006.01)
*F04D 29/18* (2006.01)

(52) U.S. Cl.
USPC ............... 415/173.1; 415/173.4; 415/175; 416/241 R

(58) Field of Classification Search
USPC .............. 415/173.1, 173.4, 168.2, 230, 175, 415/177; 416/241 R
See application file for complete search history.

(56) References Cited

U.S. PATENT DOCUMENTS

| 3,411,794 | A | 11/1968 | Allen |
| 4,257,735 | A | 3/1981 | Bradley et al. |
| 6,074,169 | A | 6/2000 | Siga et al. |
| 6,574,966 | B2 | 6/2003 | Hidaka et al. |
| 8,128,351 | B2* | 3/2012 | Narita et al. ............... 415/173.1 |
| 2002/0192074 | A1 | 12/2002 | Turnquist et al. |
| 2006/0133928 | A1 | 6/2006 | Bracken et al. |
| 2006/0153685 | A1 | 7/2006 | Bolms et al. |
| 2007/0147990 | A1 | 6/2007 | Kamimura et al. |
| 2010/0278645 | A1 | 11/2010 | Narita et al. |

FOREIGN PATENT DOCUMENTS

| DE | 197 50 516 A1 | 5/1999 |
| DE | 10 2008 003 301 A1 | 7/2008 |
| EP | 1 076 157 A2 | 2/2001 |
| EP | 1 152 124 A1 | 11/2001 |
| EP | 1 496 140 A1 | 1/2005 |
| EP | 1 878 876 A2 | 1/2008 |
| FR | 1 547 085 A | 11/1968 |

(Continued)

*Primary Examiner* — David Nhu
(74) *Attorney, Agent, or Firm* — Mattingly & Malur, P.C.

(57) ABSTRACT

A seal structure for a steam turbine is provided, which is capable of suppressing transfer of heat generated by a friction between a rotating portion and a fixed portion to the rotating portion and of suppressing an increase in the temperature of the rotating portion. A labyrinth seal device serves to suppress the amount of steam leaking from a clearance present between each stator blade (fixed portion) of the steam turbine and a rotor (rotating portion). The seal structure for the steam turbine is formed to ensure that permeable spacers made of a permeable metal are provided on the rotor and a seal stationary body and face respective seal fins provided in the labyrinth seal device.

4 Claims, 7 Drawing Sheets

FOREIGN PATENT DOCUMENTS

| | | |
|---|---|---|
| JP | 54-22049 A | 2/1979 |
| JP | 55-101733 A | 8/1980 |
| JP | 2002-228013 A | 8/2002 |
| JP | 2003-65076 A | 3/2003 |
| JP | 2003-065076 A | 3/2003 |
| JP | 2007-016704 A | 1/2007 |
| JP | 2006-177355 A | 7/2007 |
| JP | 2007-170302 A | 7/2007 |
| WO | 03/010419 A1 | 2/2003 |
| WO | 03/052240 A2 | 6/2003 |
| WO | 03/054360 A1 | 7/2003 |
| WO | 2005061855 A1 | 7/2005 |

* cited by examiner

SEALS IN STEAM TURBINE

CROSS REFERENCE

This is a continuation application of U.S. application Ser. No. 12/326,216, filed Dec. 2, 2008, now U.S. Pat. No. 8,128,351, issued Mar. 6, 2012, the contents of which are hereby incorporated by reference into this application.

The present application claims priority from Japanese application JP2007-313803 filed Dec. 4, 2007, the content of which is hereby incorporated by reference into this application.

BACKGROUND OF THE INVENTION

1. Field of the Invention

The present invention relates to a seal structure for a steam turbine.

2. Description of the Related Art

A power plant generates electricity by rotating a turbine (steam turbine) by steam which a steam generator such as a boiler generates. As steam turbines used in such a power plant, a high-pressure turbine, an intermediate-pressure turbine and a low-pressure turbine are provided in order from the upstream side of flow of the steam. The steam used for rotating the low-pressure turbine is introduced into a condenser through an exhaust hood. The steam is then condensed by the condenser and turned into water. The water is returned to the steam generator.

In the steam turbine constituting a part of the power plant, each of stator blades fixed to the inner side of a casing is arranged between rotor blades that rotate with a rotor. The rotor blade and the stator blade form a stage.

The steam introduced into the casing flows in the casing of the steam turbine. The steam then alternately passes the stator blades and the rotor blades (that are fixed to the rotor rotatably held by the casing) and expands so as to rotate the rotor. After passing through the rotor blade provided on the most downstream side of the rotor, i.e., the last-stage rotor blade, the steam is discharged outside of the casing.

In the steam turbine, the steam causes the rotor blades to rotate and thereby causes the rotor to rotate. In order to efficiently utilize the steam, it is required to minimize a clearance between a fixed portion and a rotating portion, such as clearances between the stator blades and the rotor, in order to reduce the amount of steam leaking from the clearance as much as possible and to improve a sealing property. However, when the clearance between the rotating portion and the fixed portion is minimized, the frequency of contacts between the rotating portion and the fixed portion increases. Frictional heat generated by the contacts may increase the temperature of a contact part of the rotating portion. When the contact part of the rotation portion increases in temperature due to the frictional heat, a temperature distribution of the rotating portion (in a rotational circumferential direction of the rotating portion) is not uniform, so that a rotor shaft may be bent by heat or the rotating portion may vibrate. When the amplitude of the vibrating motion is large, the steam turbine needs to be stopped in some cases.

In order to cope with the abovementioned problems, a technique relating to a seal structure is disclosed (for example, refer to JP-A-2002-228013 (refer to FIG. 1)). In the technique described in JP-A-2002-228013, a labyrinth seal device having a fin (seal fin) is conventionally provided between a rotating portion such as a rotor and a fixed portion such as a stator blade; and a member (abradable member) that has an excellent cutting property and faces the fin is used.

According to the technique described in JP-A-2002-228013, in the case where the labyrinth seal device is designed to ensure that a clearance between the fin and the abradable member is minimized, when the fin and the abradable member contact each other for some reason, the abradable member is cut by the fin. This can suppress generation of frictional heat due to the contact of the fin with the abradable member. In addition, it is possible to suppress a vibrating motion of the rotor shaft due to nonuniform heat bending (occurring due to an increase in the temperature of the rotor) of the rotor shaft.

JP-A-2007-16704 discloses a technique relating to a seal structure having a heat insulating layer for suppressing transfer of heat to a rotating portion. According to the technique described in JP-A-2007-16704, the heat insulating layer is located between the rotating portion and a fin provided at the rotating portion, for example. This arrangement suppresses transfer of frictional heat (to the rotating portion) generated by a contact of the rotating portion with a fixed portion and suppresses a vibrating motion of a rotor shaft due to nonuniform heat bending of the rotor shaft.

SUMMARY OF THE INVENTION

In each of the techniques disclosed in JP-A-2002-228013 and JP-A-2007-16704, when the rotating portion continuously rotates for a long period of time, the frictional heat is gradually accumulated. The temperature of the abradable member or the temperature of the heat insulating layer increases. The accumulated heat is slowly transferred to the rotating portion. The temperature of the rotating portion gradually increases. The rotor shaft may vibrate due to nonuniform heat bending of the rotor shaft.

It is, therefore, an object of the present invention to provide a seal structure for a steam turbine. The seal structure is capable of suppressing an increase in the temperature of a rotating portion even when the rotating portion continuously rotates for a long period of time.

In order to accomplish the object, the seal structure for a steam turbine uses permeable spacers made of a permeable metal.

The present invention can provide a seal structure for a steam turbine, which is capable of suppressing an increase in the temperature of the rotating portion even when the rotating portion continuously rotates for a long period of time.

DESCRIPTION OF THE PREFERRED EMBODIMENTS

An embodiment of the present invention will be described below with reference to the accompanying drawings.

Figure 1:
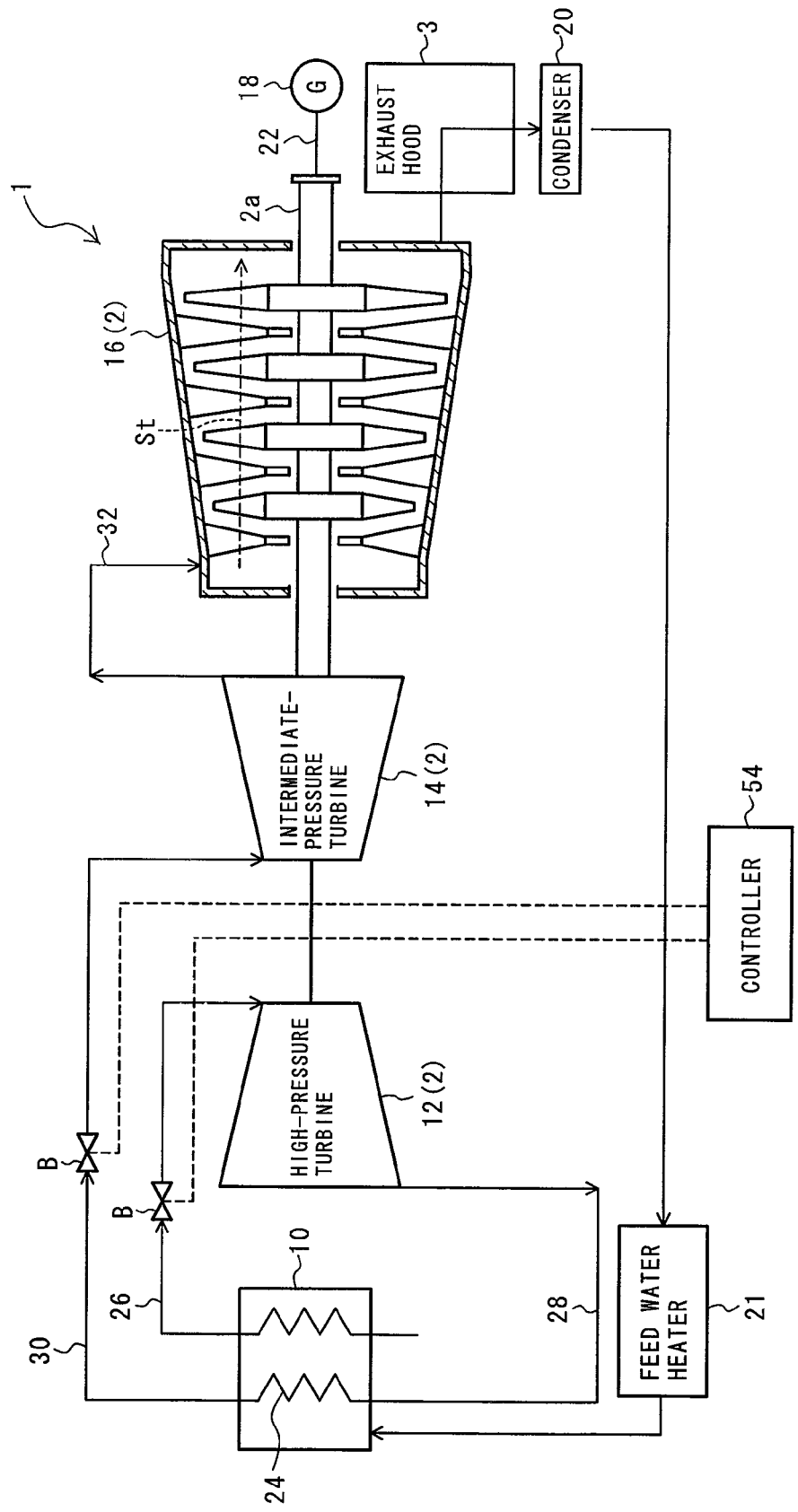
FIG. 1 is a systematic diagram showing a power plant having a steam turbine according to an embodiment of the present invention.

FIG. 1 is a systematic diagram showing a power plant having a steam turbine according to the present embodiment. As shown in FIG. 1, the power plant 1 includes a boiler 10, a steam turbine 2 (a high-pressure turbine 12, an intermediate-pressure turbine 14, and a low-pressure turbine 16), a generator 18 and a condenser 20. A rotor 2a of the low-pressure turbine 16 is connected to a drive shaft 22 of the generator 18. The generator 18 is driven by rotation of the low-pressure turbine 16 to generate electricity.

The boiler 10 is a steam generator and has a reheater 24 therein. The boiler 10 is connected to an inlet side of the high-pressure turbine 12 through a tube 26. An outlet side of the high-pressure turbine 12 is connected to the reheater 24 of the boiler 10 through a tube 28. The reheater 24 is connected to an inlet side of the intermediate-pressure turbine 14 through a tube 30. An outlet side of the intermediate-pressure turbine 14 is connected to an inlet side of the low-pressure turbine 16 through a tube 32.

Each of the tubes 26 and 30 has a control valve B. The control valve B of the tube 26 is controlled by a controller 54 and serves to control the amount of steam St to be introduced into the high-pressure turbine 12. The control valve B of the tube 30 is controlled by the controller 54 and serves to control the amount of steam St to be introduced into the intermediate-pressure turbine 14.

The steam St generated by the boiler 10 is introduced into the low-pressure turbine 16 through the high-pressure turbine 12 and the intermediate-pressure turbine 14 to cause the rotor 2a provided in the low-pressure turbine 16 to rotate. The steam St that causes the rotor 2a to rotate and is discharged from the low-pressure turbine 16 is introduced into the condenser 20 through an exhaust hood 3. The steam St is then condensed and turned into water by the condenser 20. After that, the water is delivered to a feed water heater 21 and then heated by the feed water heater 21. The heated water is reintroduced into the boiler 10 (that is the steam generator) through another feed water heater (not shown), a high-pressure water pump (not shown) and the like.

Figure 2A:
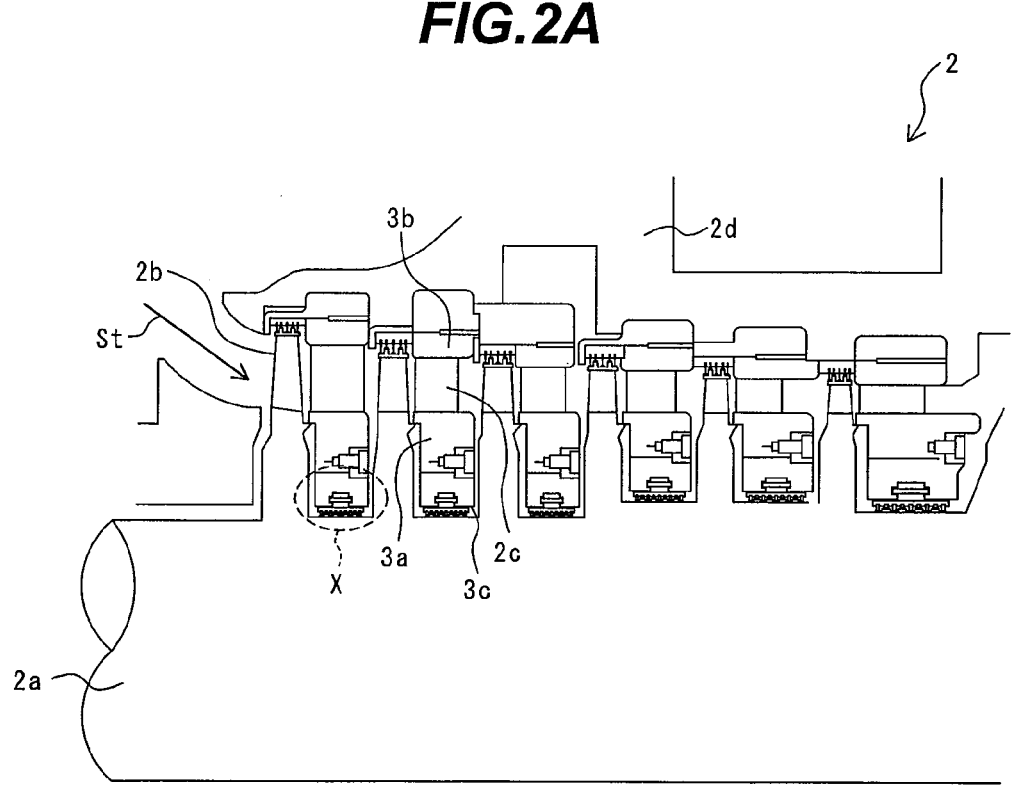
FIG. 2A is a diagram showing the configuration of a part of the steam turbine.
Figure 2B:
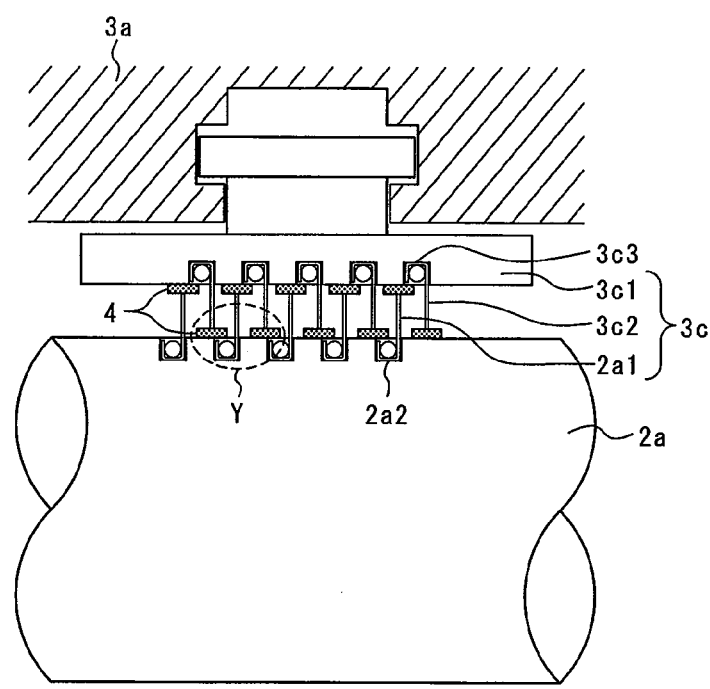
FIG. 2B is an enlarged view of an X portion shown in FIG. 2A.
Figure 3:
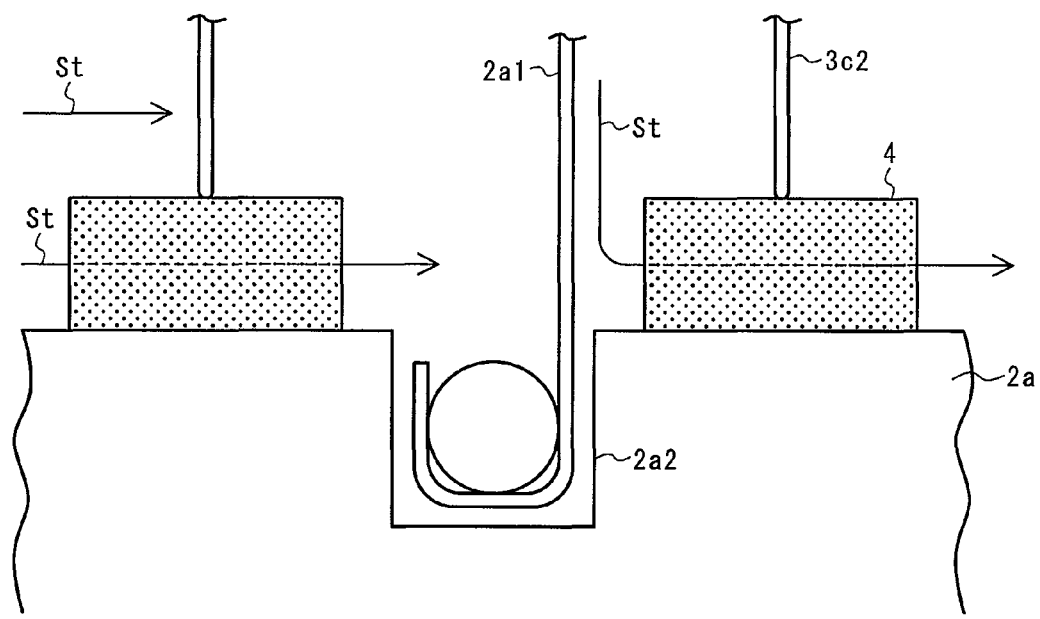
FIG. 3 is an enlarged view of a Y portion shown in FIG. 2B.

FIG. 2A is a diagram showing the configuration of a part of the steam turbine. FIG. 2B is an enlarged view of an X portion shown in FIG. 2A. FIG. 3 is an enlarged view of a Y portion shown in FIG. 2B.

Since the high-pressure turbine 12, the intermediate-pressure turbine 14 and the low-pressure turbine 16 (which are shown in FIG. 1) constitute the steam turbine 2, the present invention can be applied to the high-pressure turbine 12, the intermediate-pressure turbine 14 and the low-pressure turbine 16.

As shown in FIG. 2A, the steam turbine 2 has the rotor 2a. A plurality of rotor blades 2b is fixed to the rotor 2a in a circumferential direction of the rotor 2a. The steam turbine 2 also has a casing 2d and stator blades 2c. The casing 2d houses the rotor 2a and the rotor blades 2b. The stator blades 2c are fixed to the casing 2d via nozzle diaphragm outer rings 3b. The rotor blades 2b and the stator blades 2c are alternately arranged in an axial direction of the rotor 2a to form stages.

When the steam St generated by the boiler 10 (refer to FIG. 1) is introduced into the casing 2d, the steam St expands and passes between the stator blades 2c and the rotor blades 2b alternately to cause the rotor 2a to rotate. The steam St passes through the rotor blade 2b located on the most downstream side of the rotor 2a, i.e., the last-stage rotor blade 2b, followed by being discharged outside of the casing 2d.

In the thus configured steam turbine 2, the steam St flowing in the casing 2d causes the rotor blades 2b to efficiently rotate. It is therefore required to improve properties of seals between rotating portions (including the rotor 2a and the rotor blades 2b) and fixed portions (including the casing 2d and the stator blades 2c) and suppress the amount of steam leaking from clearances provided between the rotating portions and the fixed portions.

A clearance is provided between the rotor 2a and each of nozzle diaphragm inner rings 3a. The nozzle diaphragm inner rings 3a allow for a rotational motion of the rotor 2a. The nozzle diaphragm inner rings 3a are located at tip portions of the stator blades 2c. The clearances may cause leakage of the steam St introduced to the stator blades 2c. In order to suppress the amount of the leaking steam, a seal device such as a labyrinth seal device 3c is typically provided in the vicinity of the rotor 2a and of the nozzle diaphragm inner rings 3a to ensure that a clearance between the rotor 2a and each stator blade 2c is set to be small to improve the seal property.

FIG. 2B is the enlarged view of the X portion shown in FIG. 2A and shows an example of the labyrinth seal device. As shown in FIG. 2B, a seal stationary body 3c1 having a plurality of seal fins 3c2 is engaged with and fixed to the nozzle diaphragm inner ring 3a. The seal stationary body 3c1 has grooves 3c3 arranged at a predetermined interval. The seal fins 3c2 are respectively caulked in and fixed to the grooves 3c3. In addition, the rotor 2a has grooves 2a2 arranged at a predetermined interval. Seal fins 2a1 are respectively caulked in and fixed to the grooves 2a2. The seal fins 3c2 and the seal fins 2a1 alternately overlap each other in the axial direction of the rotor 2a.

In this way, the labyrinth seal device 3c is composed of the seal stationary body 3c1, the seal fins 3c2 and the seal fins 2a1.

In a conventional technique, the seal fins 3c2 are not in contact with the rotor 2a, and the seal fins 2a1 are not in contact with the seal stationary body 3c1. Thus, a sufficient clearance is provided between each of the seal fins 3c2 and the rotor 2a, and a sufficient clearance is provided between each of the seal fins 2a1 and the seal stationary body 3c1, to prevent a contact between each of the seal fins 3c2 and the rotor 2a and a contact between each of the seal fins 2a1 and the seal stationary body 3c1 and to thereby allow for a rotational motion of the rotor 2a. However, steam leaks from these clearances resulting in steam leakage loss. This reduces the efficiency of the steam turbine 2 (refer to FIG. 1).

In the present embodiment, on the other hand, permeable spacers 4 made of permeable metal are provided between the respective seal fins 3c2 and the rotor 2a and between the respective seal fins 2a1 and the seal stationary body 3c1.

The labyrinth seal device 3c shown in FIG. 2B is configured to ensure that the permeable spacers 4 face (are provided between) the rotor 2a and the respective seal fins 3c2 fixed to the seal stationary body 3c1, and the other permeable spacers 4 face (are provided between) the seal stationary body 3c1 and the respective seal fins 2a1 fixed to the rotor 2a.

In the configuration of the labyrinth seal device 3c, the permeable spacers 4 are provided on the rotor 2a (rotating portion) and face the seal fins 3c2, and the other permeable spacers 4 are provided on the seal stationary body 3c1 (fixed portion) and face the seal fins 2a1. The seal stationary body 3c1 is engaged with and fixed to the nozzle diaphragm inner rings 3a of the casing 2d.

The method for setting the permeable spacers 4 on the rotor 2a and setting the permeable spacers 4 on the seal stationary body $3c1$ is not limited to a particular method. For example, the permeable spacers 4 may be brazed on and fixed to the rotor $2a$ and the seal stationary body $3c1$.

In addition, the permeable spacers 4 are provided on the rotor $2a$, along the circumference of the rotor $2a$, and along the seal stationary body $3c1$, to ensure that the permeable spacers 4 respectively face tip portions of the seal fins $3c2$ and tip portions of the seal fins $2a1$.

The permeable metal is a metal material that is formed by connecting space portions (pores) of porous metal to each other and allows a gas to pass through the inside thereof. Since the tip portions of the seal fins $3c2$, and the tip portions of the seal fins $2a1$, can be in contact with the respective permeable spacers 4, the minimum clearances are provided. It is therefore possible to improve the properties of seals between the seal fins $3c2$ and the rotor $2a$.

As described above, the following prior art technique is known. That is, the technique is to remove or reduce a clearance between each seal fin $3c2$ and the rotor $2a$ and a clearance between each seal fin $2a1$ and the seal stationary body $3c1$ for improvement of the seal property and to provide a spacer (made of a material (such as an abradable material) having an excellent cutting property) on a portion (facing the tip portion of the seal fin $3c2$) of the rotor $2a$ and to provide a spacer (made of a material (such as an abradable material) having an excellent cutting property) on a portion (facing the seal fin $2a1$) of the seal stationary body $3c1$. In this known technique, however, heat generated by friction between the seal fins $3c2$ and the spacers that rotate with the rotor $2a$ is transferred to the rotor $2a$. Then, the temperature of the rotor $2a$ increases. The rotor $2a$ may be transformed (e.g., may be bent) by heat due to a nonuniform temperature distribution of the rotor $2a$, and a rotor shaft may vibrate.

It is also known that a heat insulating material is provided between the seal fin $3c2$ and the rotor $2a$, and a heat insulating material is provided between the seal fin $2a1$ and the seal stationary body $3c1$. In this technique, when the rotor $2a$ continuously rotates for a long period of time, and the spacer that rotates with the rotor $2a$ is in contact with the seal fin $3c2$ for a long period of time, heat generated by friction between the seal fin $3c2$ and the spacer is gradually accumulated. As a result, the temperature of the heat insulating layer increases. Then, the heat of the heat insulating layer is transferred to the rotor $2a$. The temperature of the rotor $2a$ increases. The rotor $2a$ may be transformed (e.g., may be bent) by heat due to a nonuniform temperature distribution of the rotor $2a$.

On the other hand, an extremely small amount of the steam St passes through the inside of each of the permeable spacers 4 made of the permeable metal in the present embodiment, as shown in FIG. 3.

The temperatures of the permeable spacers 4 are uniformly maintained at the same temperature as that of the steam St by the steam St (that passes through the inside of each permeable spacer 4). The temperatures of the permeable spacers 4 are not higher than that of the steam St.

The amount of the steam St that passes through the inside of each permeable spacers 4 needs to be set to ensure that the seal property is not affected and the temperatures of the permeable spacers 4 are maintained to be the same as the temperature of the steam St. The amount of the steam St that passes through the permeable metal (forming each permeable spacer 4) is extremely small. The amount of the steam St that passes through the permeable metal is determined based on the density and sizes of the pores. It is only necessary to use a permeable metal ensuring a steam amount that does not affect the seal property and allows the temperatures of the permeable spacers 4 to be maintained at the same level as the temperature of the steam St.

Since the temperatures of the permeable spacers 4 are maintained to be the same as the temperature of the steam St, the temperatures of the permeable spacers 4 do not become higher than the temperature of the steam St even when the rotor $2a$ continuously rotates for a long period of time and the seal fins $3c2$ are in contact with the permeable spacers 4 (that rotate with the rotor $2a$) for a long period of time. This configuration can suppress an increase in the temperature of the rotor $2a$ to a level higher than the temperature of the steam St. The rotor $2a$ is designed to be resistant to the temperature of the steam St. Therefore, when the temperature of the rotor $2a$ is maintained to be the same as that of the steam St, the rotor $2a$ is not transformed by heat (e.g., the rotor $2a$ is not transformed by excessive heat stress or is not bent due to the heat) and does not interfere with an operation of the steam turbine 2 (refer to FIG. 1).

The permeable spacers 4 may also be provided on either one of the side of the rotor $2a$ and the side of the seal stationary body $3c1$ in the labyrinth seal device $3c$ shown in FIG. 2B.

The amount of the steam St that passes through each permeable spacer 4 is small compared with the amount of the steam leaking from the clearance provided between each seal fin $3c2$ and the rotor $2a$. The amount of the steam St that passes through each permeable spacer 4 does not affect the turbine efficiency of the steam turbine 2 (refer to FIG. 1).

Figure 4A:
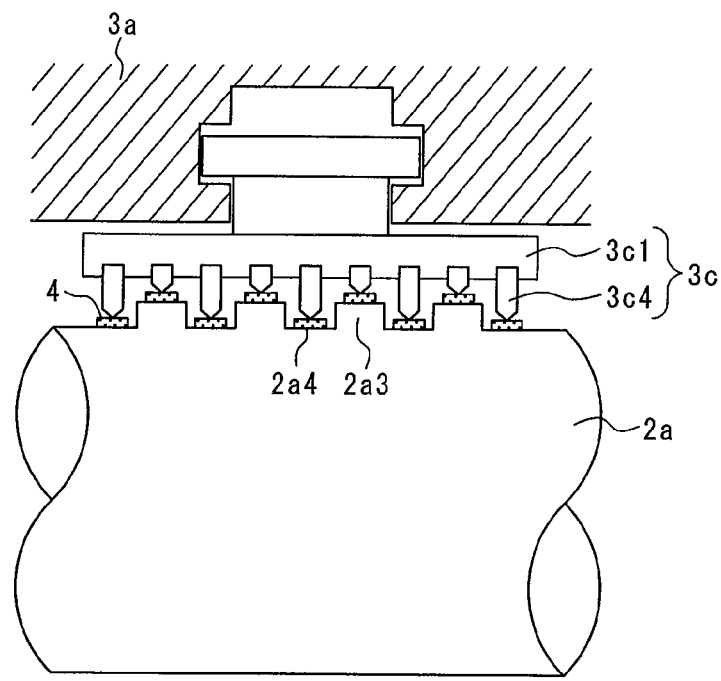
FIG. 4A is a diagram showing a high-low labyrinth seal device in which a seal stationary body has seal fins.
Figure 4B:
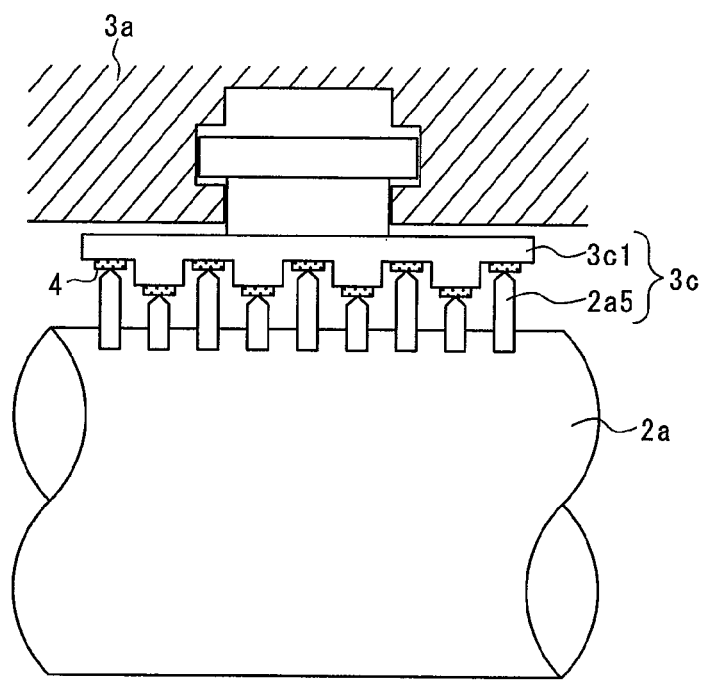
FIG. 4B is a diagram showing a high-low labyrinth seal device in which a rotor has seal fins.

The embodiment in which the permeable spacers 4 are provided in the labyrinth seal device $3c$ is described above. The present invention is not limited to this configuration. For example, the labyrinth seal device $3c$ may be a high-low labyrinth seal device in addition to the configuration shown in FIG. 2B. The present invention can be applied to the high-low labyrinth seal device. FIGS. 4A and 4B are diagrams each showing a high-low labyrinth seal device. FIG. 4A shows the high-low labyrinth seal device in which the seal stationary body has seal fins. FIG. 4B shows the high-low labyrinth seal device in which the rotor has seal fins.

The seal stationary body $3c1$ of the high-low labyrinth seal device $3c$ shown in FIG. 4A has a plurality of seal fins $3c4$. The labyrinth seal device $3c$ shown in FIG. 4A is engaged with and fixed to the nozzle diaphragm inner ring $3a$. The rotor $2a$ shown in FIG. 4A has a plurality of protruding portions $2a3$ and recessed portions $2a4$. The protruding portions $2a3$ are provided at a circumferential portion of the rotor $2a$. Each of the recessed portions $2a4$ is located between the protruding portions $2a3$. The seal fins $3c4$ face the respective protruding portions $2a3$ of the rotor $2a$ and recessed portions $2a4$.

As shown in FIG. 4A, the permeable spacers 4 are provided on the protruding portions $2a3$ of the rotor $2a$ and on the recessed portions $2a4$ of the rotor $2a$ and face the respective seal fins $3c4$. The permeable spacers 4 can serve to improve the seal property between the seal fins $3c4$ and the rotor $2a$.

The permeable spacers 4 may also be provided on either the protruding portions $2a3$ of the rotor $2a$ or the recessed portions $2a4$ of the rotor $2a$ in the high-low labyrinth seal device $3c$.

As shown in FIG. 4B, the high-low labyrinth seal device $3c$ may have a structure in which seal fins $2a5$ are provided at the circumferential portion of the rotor $2a$. In this case, the seal stationary body $3c1$ has recessed portions and protruding portions. The recessed portions and protruding portions of the seal stationary body $3c1$ face the respective seal fins $2a5$. As shown in FIG. 4B, the permeable spacers 4 are provided on the recessed portions and protruding portions of the seal stationary body 3c1. Alternatively, the permeable spacers 4 may be provided on either the recessed portions of the seal stationary body 3c1 or the protruding portions of the seal stationary body 3c1.

In the description above, the permeable spacers 4 are provided for the labyrinth seal device 3c that is located between the stator blade 2c and the rotor 2a, as shown in FIG. 2A. The permeable spacers 4 may be provided at a tip portion of each rotor blade 2b.

Figure 5:
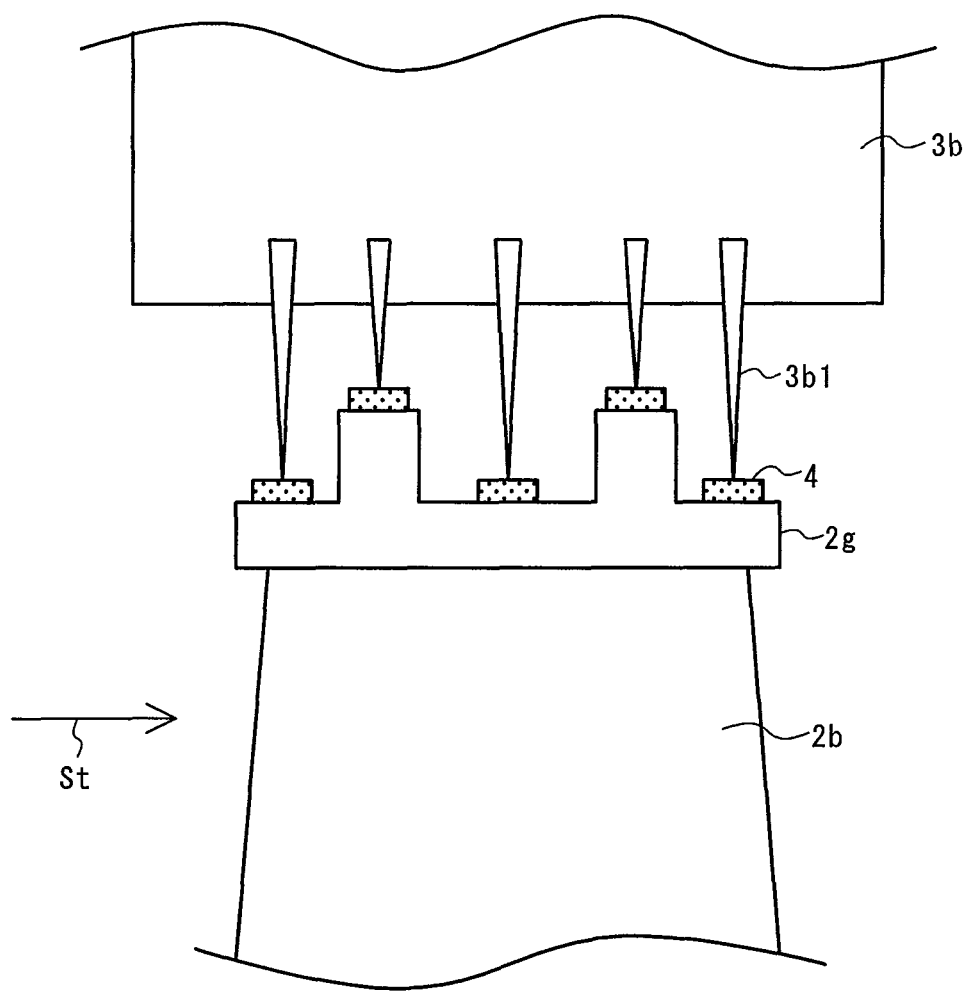
FIG. 5 is a schematic diagram showing a tip portion of a rotor blade.

FIG. 5 is a schematic diagram showing the tip portion of the rotor blade 2b. As shown in FIG. 5, a cover 2g is provided on the tip portion of the rotor blade 2b. The cover 2g serves to reduce a clearance between the rotor blade 2b and the nozzle diaphragm outer ring 3b. The nozzle diaphragm outer ring 3b has seal fins 3b1 and faces the cover 2g.

The permeable spacers 4 are provided on the cover 2g and face the respective seal fins 3b1.

In this structure, even when the rotor blade 2b rotates to cause the seal fins 3b1 to contact the permeable spacers 4 and frictional heat generated by the contacts causes the permeable spacers 4 to increase in temperature, the temperatures of the permeable spacers 4 are not higher than the temperature of the steam St due to the steam St that passes through the insides of the permeable spacers 4. Therefore, the temperatures of the rotor blades 2b do not become higher than those of the steam St.

Figure 6:
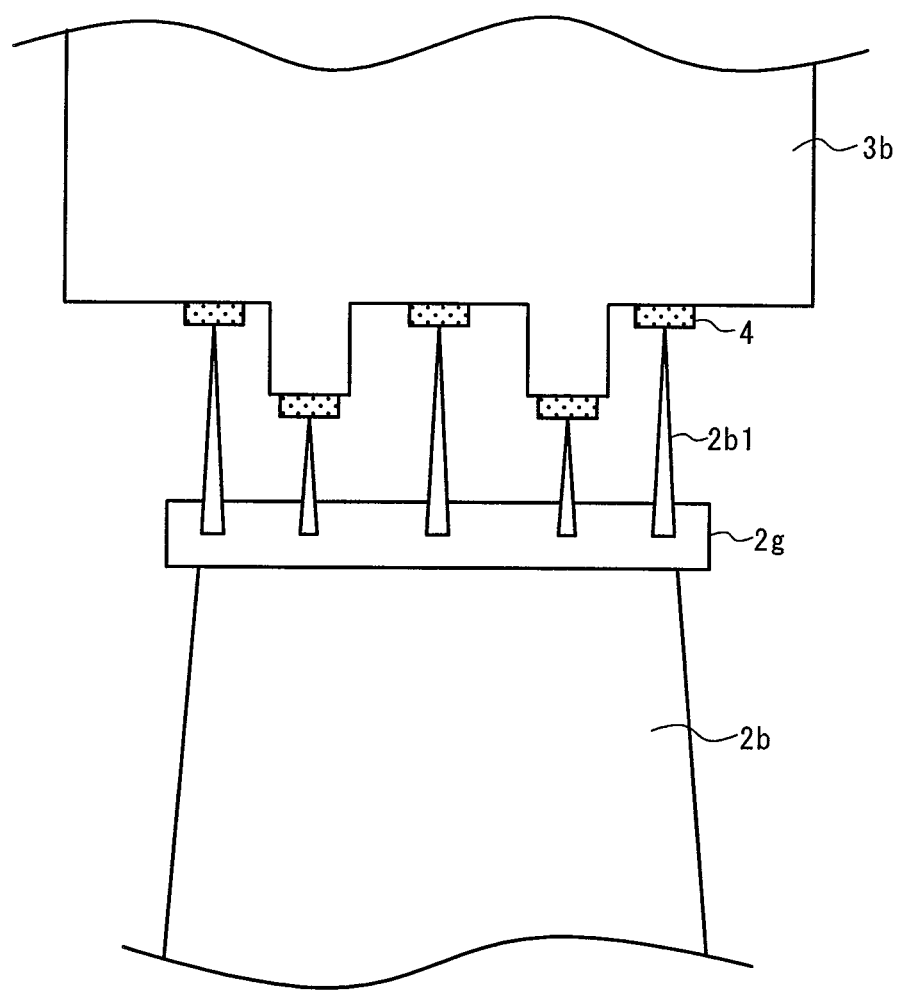
FIG. 6 is a diagram showing a structure in which the tip portion of the rotor blade has seal fins.
Figure 7:
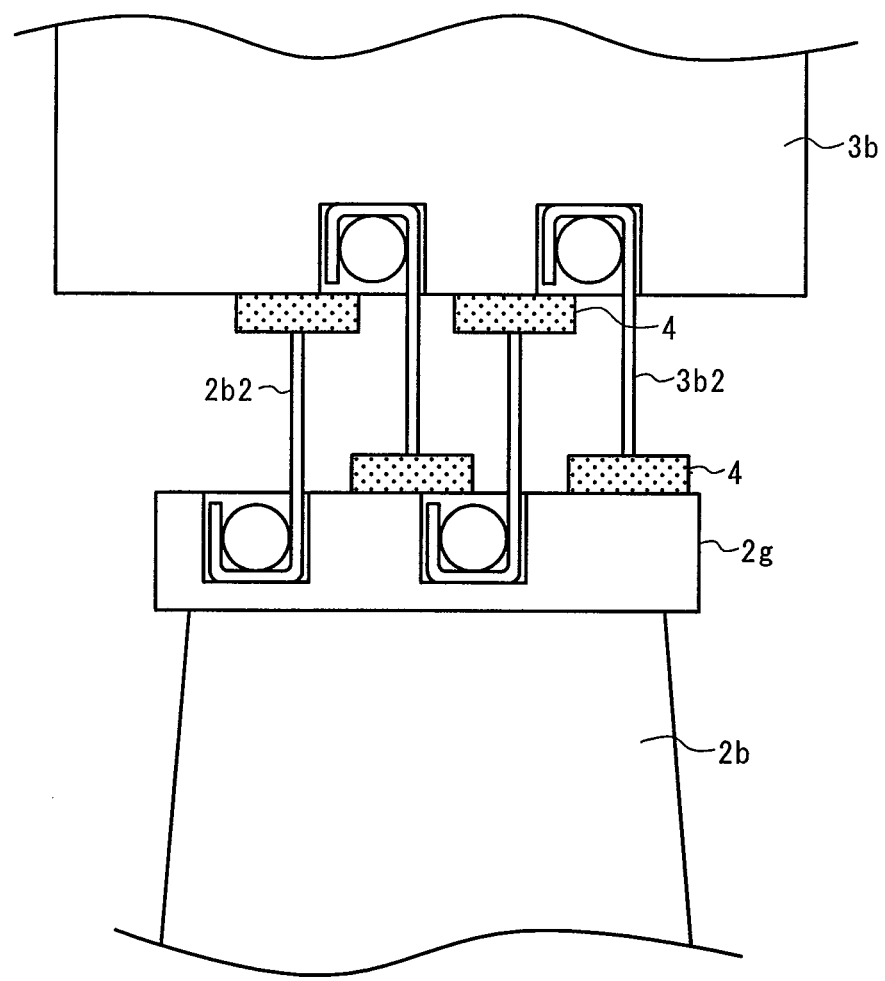
FIG. 7 is a diagram showing a structure in which a nozzle diaphragm outer ring has seal fins and the rotor blade has other seal fins at the tip portion thereof.

The seal fins may be provided at the tip portion of each rotor blade. FIG. 6 is a diagram showing a structure in which the seal fins are provided at the tip portion of the rotor blade. FIG. 7 is a diagram showing a structure in which seal fins are provided on the nozzle diaphragm outer ring and seal fins are provided at the tip portion of the rotor blade.

As shown in FIG. 6, for example, seal fins 2b1 may be provided at the tip portion of each rotor blade 2b (or on the cover 2g). In this structure, the permeable spacers 4 are provided on the nozzle diaphragm outer ring 3b and face the respective seal fins 2b1.

As shown in FIG. 7, seal fins 3b2 may be provided on the nozzle diaphragm outer ring 3b, and seal fins 2b2 may be provided at the tip portion of each rotor blade 2b. In this structure, the permeable spacers 4 are provided on the nozzle diaphragm outer ring 3b, and the other permeable spacers 4 are provided at the tip portion of each rotor blade 2b (or on the cover 2g).

When the seal fins 3b2 are provided at the nozzle diaphragm outer ring 3b and the seal fins 2b2 are provided at the tip portion of each rotor blade 2b (or the seal fins 2b2 are provided on the cover 2g), the permeable spacers 4 may also be provided either on the nozzle diaphragm outer ring 3b or at the tip portion of each rotor blade 2b (or on the cover 2g).

The permeable spacers 4 may be provided at locations at which a rotating portion (such as the rotor 2a (refer to FIG. 2A) and a fixed portion (such as the casing 2d (refer to FIG. 2A) are in contact with each other. It is possible to improve the seal property since the rotating portion is not subjected to high temperature steam.

In each of the structures described above, the amount of the steam that passes through the permeable spacers 4 can be properly set in consideration of the seal property and a cooling property.

The invention claimed is:

1. A steam turbine, comprising a seal device provided between a rotating portion of the steam turbine and a fixed portion of the steam turbine, the rotating portion being composed of a rotor of the steam turbine and members that rotate with the rotor, the fixed portion being composed of a casing of the steam turbine and members fixed to the casing, the casing containing the rotating portion, wherein the seal device further comprises a plurality of seal fins provided on least one of the rotating portion and the fixed portion, and permeable spacers that allow a part of leaking steam to pass through the permeable spacers facing the plurality of respective seal fins.

2. The steam turbine according to claim 1, wherein the permeable spacers consist of permeable metal allowing the steam to pass through an interior thereof.

3. The steam turbine according to claim 2, wherein the members fixed to the casing are stator blades fixed to the casing, at least one of tip portions of the stator blades and of the rotor have the plurality of seal fins, the seal fins facing the tip portions of the respective stator blades when the rotor has the seal fins, and at least one of the tip portions of the stator blades and of the rotor have thereon the permeable spacers made of the permeable metal, the permeable spacers facing the respective seal fins.

4. The steam turbine according to claim 2, wherein the members that rotate with the rotor are rotor blades of the rotor, at least one of the casing and the tip portions of the rotor blades have the plurality of seal fins, the seal fins facing the tip portions of the respective rotor blades when the casing has the seal fins, and at least one of the casing and the tip portions of the rotor blades have thereon the permeable spacers made of the permeable metal, the permeable spacers facing the plurality of respective seal fins.

* * * * *